United States Patent Office 3,139,768
Patented July 7, 1964

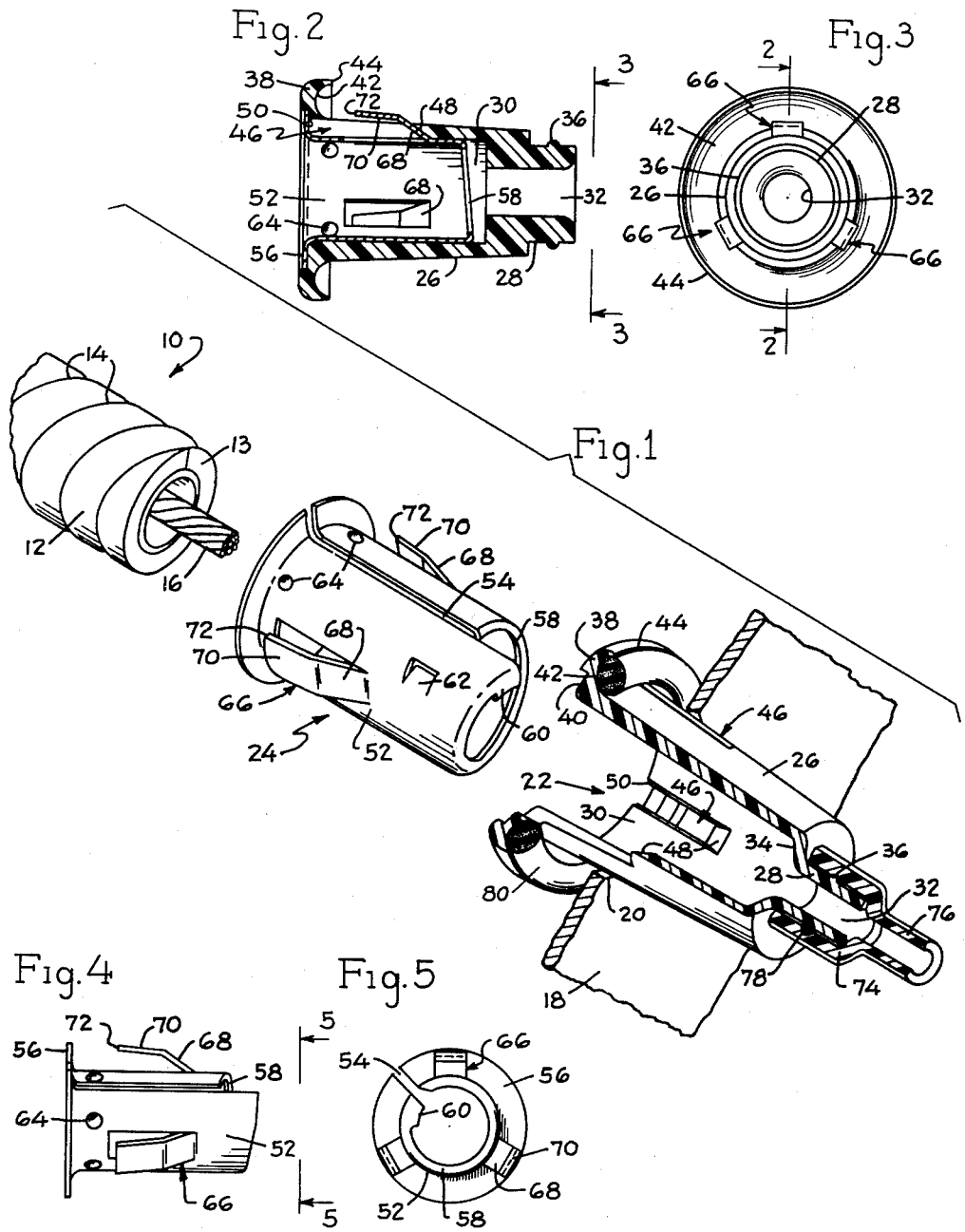

3,139,768
CABLE FASTENER ASSEMBLY
Donald L. Biesecker, Arlington Heights, Ill., assignor to Illinois Tool Works Inc., Chicago, Ill., a corporation of Delaware
Filed Dec. 11, 1961, Ser. No. 158,492
7 Claims. (Cl. 74—501)

This invention relates to means for fastening a cable to a workplate and more particularly, relates to means for fastening a brake cable to a workplate, for example, a workplate such as the brake drum housing on a motor vehicle.

Various brake cable fastening assemblies have been heretofore proposed which have suffered the disabilities of being cumbersome, expensive, and subject to breakage in actual field use, for example, on a motor vehicle.

It is an object of this invention to provide a brake cable assembly fastening means which overcome these disabilities.

It is a further object of this invention to provide a brake cable fastening means which is simple to assemble, is economical, snaps into place on a workplate on a motor vehicle or the like, is flexible, fits a wide range of tolerances, and is otherwise well adapted for the purposes for which it is designed.

It is another object of this invention to provide a brake cable fastening means which is sealing mounted to the workplate.

Still another object of this invention is to provide a brake cable fastening means which prevents dislodgment of the cable and allows cocking of the cable relative to the workplate without destroying the fastening means.

The novel features that are characteristic of this invention are set forth with particularity in the appended claims. The invention itself, however, both as to its organization and its method of operation, together with additional objects and advantages thereof, will best be understood by the following description of specific embodiments when read in connection with the accompanying drawings in which:

FIG. 1 is an exploded perspective view of the fastening means brake cable and workplate, a portion of the view being in section;

FIG. 2 is a sectional view along lines 2—2 of FIG. 3 showing two major components of the fastening means in assembled relation;

FIG. 3 is an end view along lines 3—3 of FIG. 2;

FIG. 4 is a front elevational view of one of the components shown in FIGS. 1 through 3; and FIG. 5 is an end view along lines 5—5 of FIG. 4.

As shown in FIG. 1, brake cables 10 conventionally are formed with a sheath 12 which may be in the form of a flat wire helically wound in a manner that leaves grooves 14 on the outer periphery thereof. The end 13 of the cable sheath 12 is conventionally cut transversely to the axis of the sheath and the sheath 12 surrounds suitable cable wires 16 which are adapted to move relative thereto.

The sheath 12 is preferably fixedly mounted to a workplate 18 having an aperture 20 of a predetermined diameter therein so that relative movement of the wire 16 is obtainable. For this purpose I provide a two part bushing comprising a grommet means 22 and an insert means 24. The grommet means 22 preferably is molded of relatively strong plastic material as, for example, nylon or the like, and is of generally annular shape. More particularly, the grommet means 22 comprises an elongated first shank portion 26 and a smaller shank portion 28 which define first and second bores 30 and 32 connected by an internal shoulder 34. As seen in FIG. 2, shank portion 26 has a tapered outer diameter, the portion 26 adjacent to shank portion 28 preferably being smaller than the aperture 20 in the workplate and the upper portion of shank 26 adjacent to head 38 preferably having a diameter slightly greater than the diameter of hole 20 in the workplate 18. The bores 30 and 32 are each of relatively constant diameter, although the lower portion of bore 32 adjacent to the terminal surface of the grommet means preferably has a belled mouth. Shank portion 28 has bead means 36 formed on the outer diameter thereof, which is adapted to retain a cable wiping means in those applications where prevention of dust from being transferred to opposite sides of the workplate is particularly desirable as shall be explained.

The head portion 38 of the grommet means 22 is formed with a shallow countersunk area 40 immediately adjacent to the bore 30 on the upper side of the head and has a curvilinear under surface 42 which terminates in a thin relatively flexible lip portion 44 at the outer periphery of the head. As will be perceived from the drawings, lip portion 44 is substantially aligned with the axis of the grommet means 22. It will be realized that the head 38 is considerably larger than the diameter of the hole 20.

The first shank portion 26 is formed with a plurality of axially aligned slots 46 which extend completely through the side walls of shank portion 26. It is to be particularly noted that the lower end of the slots 46 are formed with an angular surface 48 rather than being substantially transverse to the axis of the grommet. It will also be noted that the slots 46 extend up to and intersect counterbore 40 at 50. Thus, when the grommet is inserted in the work hole 20, the interruptions in the side walls of bore 30 affords a radial contraction of the grommet 22. This feature enables the grommet to fit a wide range of tolerances of holes 20 in workpieces 18.

The insert means 24 is adapted to be telescopically assembled within bore 30 of the grommet means 22. The insert means 24 is preferably made of sheet metal rolled into a tubular form to provide a tubular shank 52. The shank is formed with a split line 54 coextensive the length of the shank and has a radially enlarged head flange 56 at the upper end thereof which fits with counterbore 40 of grommet 22. The lower end of the tubular shank 52 is formed with a helical inturned flange 58 which is of a form complementary to the grooves 14 in the brake cable sheath 12. The lower most end of the tubular portion 52 is formed with a stop tab 60 which limits the amount of helical movement (bottoms) of the end 13 of the brake cable 10. A short stubby arm 62 is struck out of the side walls of the shank 52, the end surface of which is radially inwardly directed and disposed so as to inhibit or prevent unscrewing motion of the brake cable after assembly to the insert while permitting relatively easy assembly thereof. A plurality of inwardly directed dimples 64 are formed in the tubular insert side walls adjacent the head 56 to further inhibit rotational movement and to also aid in preventing pull-out of the brake cable 10 from assembled relationship with the insert 24.

A plurality of spring arms 66 (here shown as 3 in number) are struck out of the side walls of the insert 24. The spring arms 66 are formed with a first angularly disposed portion 68 and a second angularly disposed portion 70 terminating in an end surface 72. The angle of spring arm portion 68 relative to the axis of the insert 24 is greater than the angle of spring arm portion 70 and is substantially the same as the angle of surface 48 of the grommet means 22. The end surface 72 of the spring arm is spaced from the head 56 a sufficient distance such that it will engage the underside of plate 18 as shall become apparent.

As aforediscussed a cable wiper member 74 of suitable material may be disposed on the smaller shank portion 28 of the grommet means and is formed with complementary groove means 78 for snapping over the bead 36. The lower end of the cable wire wiper 74 is preferably flexible and has an internal diameter which is slightly smaller than the brake cable wire 16. Due to the flexibility of end portion 74 the cable wire 16 will be wiped every time it is moved relative to the cable sheath 12 preventing contaminants from moving the wire 16. At the other end of the grommet means 22, a flexible member, for example, sponge rubber gasket means 80 is preferably disposed in the concavity 42 underneath the head for purposes which will be explained.

To assemble the bushing to the cable, the insert means 24 is disposed within the grommet means 22 so that the spring arms 66 extend through the grooves 46 as shown in FIGS. 3 and 4. The cable sheath 12 may be threadingly mounted to flange 58 of the insert either prior to or after assembly of the insert 24 and grommet 22 as a unit to the workplate 18. Also the insert may be mounted on the end of the cable sheath prior to assembly to the grommet. The assembly of the bushing to the workplate is a simple push-on movement so that the arms 66 first deflect inwardly as passing through the hole 20 and then snap outwardly to engage and retain the entire bushing and the brake cable to the workplate 18. The thin lip portion 44 on the head of the grommet means operates as a resilient back bias opposing the spring pressure imposed by the spring arm 66 of the insert. The slot surfaces 48 of the grommet means prevents undue radial distortion of the arms 66 to provide backup strength as well as to prevent collapse of the spring arms 66 when cocking of the bushing relative to the workplate occurs. The sponge rubber or other similar gasket 80 will maintain a sealing relationship with the plate through a relatively large angle of cocking sufficient to withdraw contact of the lip 44 relative to the surface of the workplate 18.

Although a specific embodiment of the invention has been shown and described, it is with full awareness that many modifications thereof are possible. The invention, therefore, is not to be restricted except insofar as is necessitated by the prior art and by the spirit of the appended claims.

What is claimed as the invention is:

1. A brake cable assembly adapted to pass through a hole in a workplate comprising in combination an annular cable housing sheath member having helical grooves in the outer surface thereof and surroundingly disposed to cable wire means for relative movement thereof, grommet means having an enlarged head of greater diameter than said hole in the workplate and having a first bore of substantial length surroundingly disposed to said sheath member and also having a second bore larger than cable wire means and smaller than said first bore to define an internal shoulder, the outer surface of said grommet means being stepped to provide an end shank portion of reduced outer diameter and a relatively larger tapered shank portion, axially aligned groove means formed in the side walls of said first bore and providing openings adjacent to said head, cable sheath and grommet retention means comprising sheet material means of generally annular shape and disposed intermediate said cable sheath and said grommet means, one end of said sheet material means being formed with inturned flanges arranged in a helical screw configuration complementary to the grooves in said sheath for receipt thereof, said one end being disposed adjacent said internal shoulder and formed with stop tab means to provide limited helical screw assembly of one end of said sheath therewith, the other end of said cable sheath and grommet retention means being formed with head means for cooperation with the head means of said grommet means, a plurality of axially aligned snap-in, flexible, spring tab arms struck out of and formed in said grommet and cable sheath retention means and located for extension through said axially aligned grooves in said grommet means, the end portions of said spring tabs being adapted to move radially inwardly then outwardly upon passage through said hole in said workplate for spring retention against the side of said work panel opposite to said head means of said grommet means, the wall portions of said grommet means adjacent said groove means therein providing a limiting support for the spring tab arms preventing undesirable radial distortion thereof under load, and means formed in the side walls of said cable sheath and grommet retention member preventing unauthorized helical unscrewing movement of said cable sheath after assembly thereof.

2. The assembly set forth in claim 1 wherein the grommet means is formed of plastic material, the enlarged head thereof at the outer periphery having a relatively thin flexible terminal portion for engaging the surface of the workplate surrounding the hole therein in opposition to the said spring tabs to provide a resilient back bias thereagainst and to impart a flexibility in mounting of said brake cable assembly to said workplate.

3. The assembly set forth in claim 2 wherein resilient sealing means is located intermediate the head of said grommet means and the workplate surface surrounding said hole to seal the assembly independent of axial cocking of the grommet relative to the axis of said hole in the workpiece.

4. The assembly set forth in claim 1 wherein the reduced diameter shank portion of said grommet means is formed with retaining means for receipt of flexible cable wire wiping means which extends thereover and therebeyond for wiping engagement with the cable wire means extending therethrough.

5. The brake cable assembly set forth in claim 1 wherein the means for preventing unauthorized helical unscrewing movement of said cable sheath is in the form of a plurality of radially inwardly directed dimples formed in the side walls of said cable sheath and grommet retention member in the area adjacent the head thereof and a radially inwardly directed flexible tab member struck out of said side walls in the vicinity of the inturned helical flanges at the said one end thereof.

6. The assembly set forth in claim 1 wherein the spring tab arms struck out of said cable sheath and grommet retention member each have a first portion disposed at a predetermined diverging angle from the axis of the cable sheath and grommet retention member and a second outer portion disposed at a predetermined lesser angle to said axis, the groove means in said grommet means having an end surface formed at an angle substantially complementary to said predetermined diverging angle to limit radial distortion of said spring tab arms.

7. For a brake cable adapted to pass through a hole in a workplate wherein an annular cable housing sheath member having helical grooves in the outer surface thereof and surroundingly disposed to cable wire means for relative movement thereof is mounted to the workplate, retaining means comprising plastic grommet means having an enlarged head of greater diameter than said hole in the workplate and having a first bore of substantial length adapted to be surroundingly disposed to said sheath member and also having a second bore larger than cable wire means and smaller than said first bore to define an internal shoulder, the outer surface of said grommet means being stepped to provide an end shank portion of reduced outer diameter and a relatively larger axially tapered shank portion, said grommet means having a plurality of axially aligned groove means formed in the side walls of said first bore providing openings adjacent to said head, annular sheet metal insert means adapted to be disposed intermediate said cable sheath and said grommet means, one end of said insert means being formed with inturned flanges arranged in a helical screw configuration complementary to the grooves in said sheath for receipt thereof, said one end being disposed adjacent said internal shoulder of said grommet means and formed with stop tab means to provide limited helical screw assembly of one end of said sheath therewith, the other end of said insert means being formed with head means engageable with the head means of said grommet means, a plurality of axially aligned snap-in, flexible spring tab arms struck out of and formed in said insert means and located for extension through said axially aligned grooves in said grommet means, the end portions of said spring tabs being adapted to move radially inwardly then outwardly upon passage through said hole in said workplate for spring retention against the side of said work panel opposite to said head means of said grommet means, the wall portions of said grommet means adjacent said groove means therein providing a limiting support for the spring tab arms preventing undesirable radial distortion thereof under load, and means formed in the side walls of said cable and grommet retention member preventing unauthorized helical unscrewing movement of said cable sheath after assembly thereof.

References Cited in the file of this patent

UNITED STATES PATENTS

| | | |
|---|---|---|
| 2,555,292 | Poupitch | May 29, 1951 |
| 2,687,862 | Crowther | Aug. 31, 1954 |
| 3,045,308 | Tobey | July 24, 1962 |